US006313986B1

(12) United States Patent
Jang

(10) Patent No.: US 6,313,986 B1
(45) Date of Patent: Nov. 6, 2001

(54) POWER AND SIGNAL SUPPLYING APPARATUS FOR INTEGRATION TYPE PERSONAL COMPUTER

(75) Inventor: Se-Ki Jang, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/634,653

(22) Filed: Aug. 8, 2000

(30) Foreign Application Priority Data

Oct. 29, 1999 (KR) .................................................. 99/47568

(51) Int. Cl.[7] ...................................................... H05K 5/00
(52) U.S. Cl. .......................... 361/686; 361/756; 395/855; 248/694
(58) Field of Search ........................... 361/686, 680–683, 361/725–727, 741, 754, 756; D6/396, 397; D14/100, 114; 395/868, 855; 248/694

(56) References Cited

U.S. PATENT DOCUMENTS 5,973,916 * 10/1999 Han ........................................ 361/682
6,216,999 * 4/2001 Olson et al. .......................... 248/694
6,275,375 * 8/2001 Nam ...................................... 361/682

* cited by examiner

Primary Examiner—Leo P. Picard
Assistant Examiner—Hung Van Duong
(74) Attorney, Agent, or Firm—Robert E. Bushnell, Esq.

(57) ABSTRACT

An apparatus for supplying a power and signal for an integration type personal computer is disclosed. The apparatus according to the present invention includes a docking PCB (Printed Circuit Board) having a plurality of terminals connected with a main PCB and a switching mode power supply apparatus of a monitor and an insertion jack at a lower portion of the docking printed circuit board, and a docking connector fixed at one side of a cover of a computer and having a plurality of terminals connected with the main PCB of the computer and having an upper portion inserted into an insertion jack of the docking PCB and connected with a plurality of terminals of the docking PCB, whereby a power of the switching mode power supply apparatus installed in the monitor is supplied to the computer, and a signal of the computer is supplied to the monitor. The power and signal supply apparatus according to the present invention is of a docking type, so that it is possible to obtain an easier engagement and disassembling process of the system and prevent any damage such as a disconnection problem by compensating a position deviation which occurs during assembly.

16 Claims, 5 Drawing Sheets

POWER AND SIGNAL SUPPLYING APPARATUS FOR INTEGRATION TYPE PERSONAL COMPUTER

CLAIM OF PRIORITY

This application makes reference to, incorporates the same herein, and claims all benefits accruing under 35 U.S.C. §119 from my application COMPUTER HAVING POWER AND SIGNAL SUPPLY APPARATUS filed with the Korean Industrial Property Office on Oct. 29, 1999 and there duly assigned Serial No. 47568/1999.

BACKGROUND OF THE INVENTION

1. Field of the Invention

The present invention relates to a power and signal supplying apparatus for an integration type personal computer (PC), and in particular to a power and signal supplying apparatus for an integration type personal computer which is capable of implementing an easier assembling and disassembling operation of a structure for connecting a power and signal between a monitor and a computer and preventing any damage which may occur during an assembling and disassembling operation.

2. Description of the Background Art

Generally, in a monitor, an electric beam is emitted from an electric gun of a CRT (Cathode ray Tube) onto a fluorescent material coated on the CRT based on a video signal to thereby obtain an image with various brightness and colors, so that certain characters, symbols, graphics, etc. are displayed.

A conventional computer monitor includes a front casing having various function buttons thereon, a main PCB (Printed circuit board) for mounting various circuit parts on a bottom plate fixed at the front casing, a CRT (Cathode Ray Tube) fixed at the front casing, a video shield for shielding electric beams emitted from the CRT by surrounding a video PCB of the CRT, and a degaussing coil fixed at the CRT for degaussing a magnetic field formed at the CRT.

In addition, the monitor includes a CRT shield for shielding electromagnetic radiation at a front portion of the CRT, a shield cover for shielding electric waves at a rear portion of the CRT and the main PCB, and a rear casing engaged to the front casing for protecting inner parts.

In a conventional computer installation structure, the monitor is operated by receiving electric power from a power cable, and a signal outputted from the computer through the cable connecting the monitor and the computer is received by the monitor for thereby displaying a certain image on the screen of the computer.

In addition, a power cable is additionally used for driving the computer. Therefore, the installation space of various cables is complicated, and a large installation space is required.

In order to overcome the above-described problems, an integration type personal computer in which the monitor and computer are integrally formed has been introduced. However, in the above-described integration type personal computer, the cable for supplying an electric power and transmitting and receiving signals is installed inside and outside the system, so that the assembling process is increased. In addition, when assembling and disassembling the system, the cables must be assembled and disassembled for thereby increasing the installation process.

SUMMARY OF THE INVENTION

It is therefore an object of the invention to provide an improved integration-type personal computer.

It is also an object of the invention to provide an improved power and signal supplying apparatus of a computer.

A further object is to provide an integration-type personal computer which requires less assembly.

A still further object of the invention is to provide an integration-type personal computer in which the cable for supplying an electric power and transmitting and receiving signals is installed inside the system.

A yet further object of the invention is to provide an integration-type personal computer system not requiring cable assembly when the system is assembled.

Accordingly, it is an object of the present invention to provide an integration type personal computer and a power and signal supply apparatus which are capable of implementing a simple assembling process for transmitting and receiving a power and signals and an easier disassembling and assembling process.

In order to achieve the above objects, there is provided an apparatus for supplying an electric power and signal for an integration type computer which includes a docking PCB (Printed Circuit Board) having a plurality of terminals connected with a main PCB and a switching mode power supply apparatus of a monitor and an insertion jack at a lower portion thereof, and a docking connector fixed at one side of a cover of a computer and having a plurality of terminals connected with the main PCB of the computer and having an upper portion inserted into an insertion jack of the docking PCB and connected with a plurality of terminals of the docking PCB, whereby a power of the switching mode power supply apparatus installed in the monitor is supplied to the computer, and a signal of the computer is supplied to the monitor.

In the present invention, the docking connector is movably fixed at one side of a cover of the computer and is inserted into the insertion jack based on a position correction when an insertion position in the insertion jack of the docking PCB is deviated.

In order to achieve the above objects, there is provided an apparatus for supplying a power and signal for an integration type personal computer which includes a docking PCB (Printed Circuit Board) having a plurality of terminals connected with a main PCB and a switching mode power supply apparatus of a monitor and an insertion jack at a lower portion thereof, a docking connector fixed at one side of a cover of a computer and having a plurality of terminals connected with the main PCB of the computer and having an upper portion inserted into an insertion jack of the docking PCB and connected with a plurality of terminals of the docking PCB, and a docking guide inserted into an insertion jack of the docking PCB and having an insertion hole having a taper formed at a bottom surface, so that the docking guide is slidably inserted along a slanted surface of the taper, whereby a power of the switching mode power supply apparatus installed in the monitor is supplied to the computer, and a signal of the computer is supplied to the monitor.

Additional advantages, objects and features of the invention will become more apparent from the description which follows.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
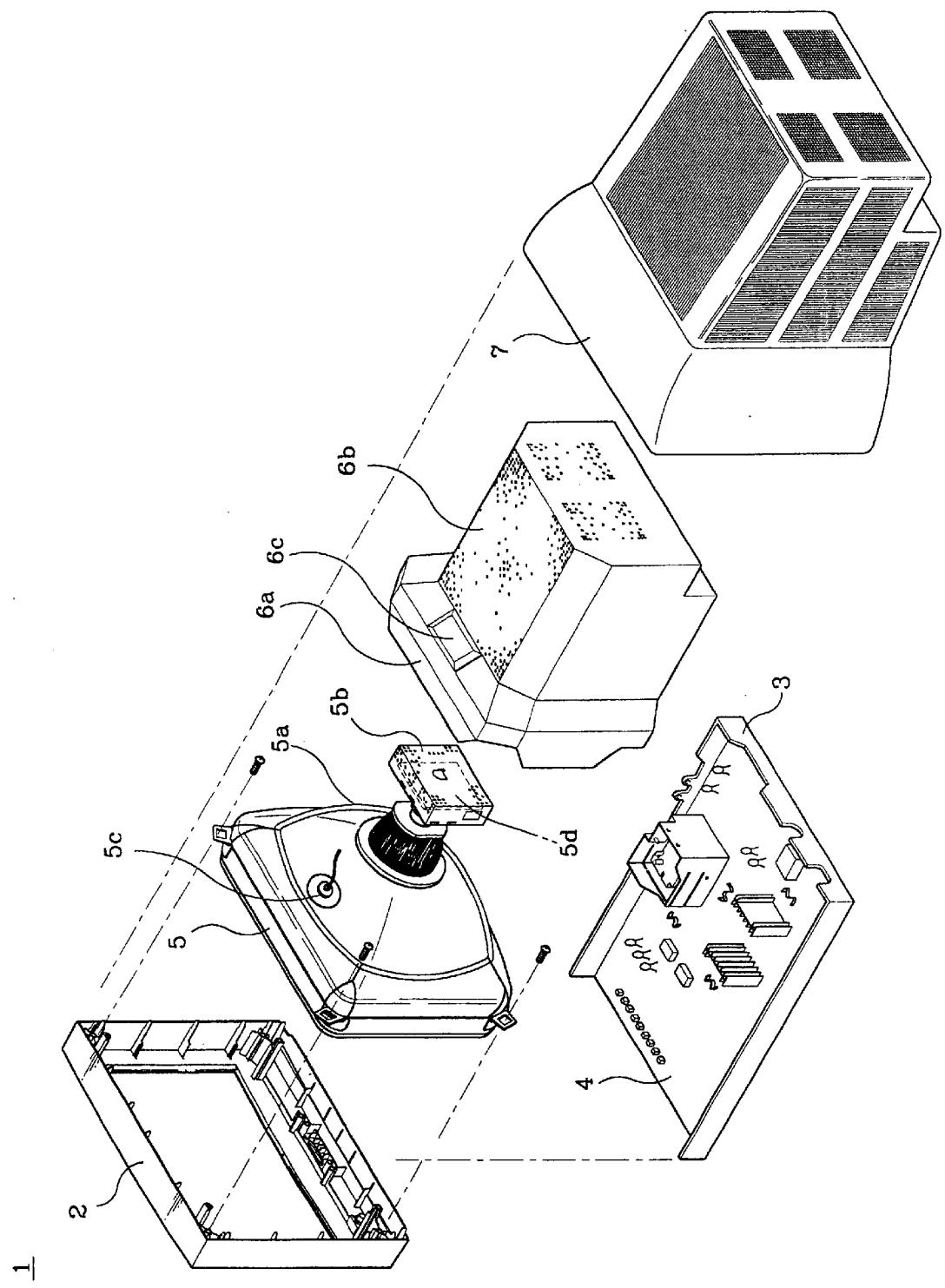
FIG. 1 is an exploded perspective view illustrating a conventional monitor.

Turning now to the drawings, FIG. 1 is a perspective view illustrating the construction of the conventional computer discussed above. As shown therein, a monitor 1 includes a front casing 2 having various function buttons thereon, a main PCB (Printed circuit board) 4 for mounting various circuit parts on a bottom plate 3 fixed at the front casing 2, a CRT (Cathode Ray Tube) 5 fixed at the front casing 2, a video shield 5d for shielding electric beams emitted from the CRT 5 by surrounding a video PCB 5b of the CRT 5, and a degaussing coil 5a fixed at the CRT 5 for degaussing a magnetic field formed at the CRT 5.

In addition, the monitor 1 includes a CRT shield 6a for shielding electric waves at a front portion of the CRT 5, a shield cover 6b for shielding electric waves at a rear portion of the CRT 5 and the main PCB 4, and a rear casing 7 engaged to the front casing 2 for protecting inner parts.

Figure 2:
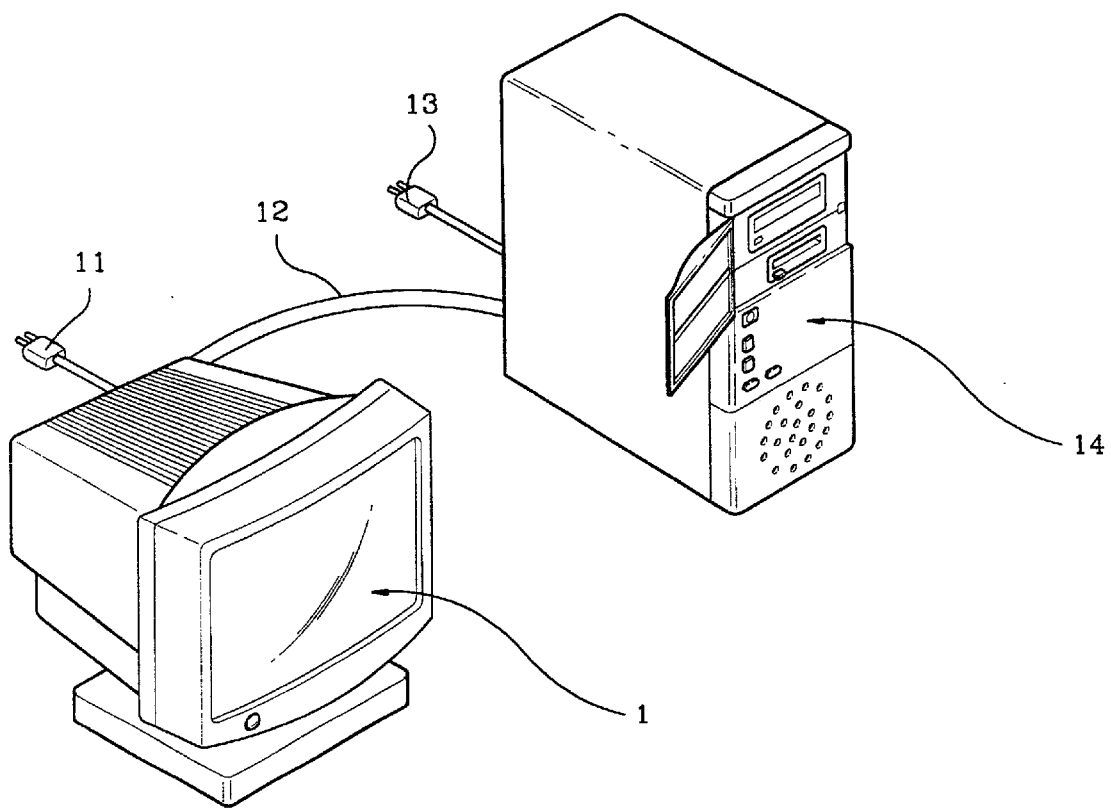
FIG. 2 is a perspective view illustrating a conventional computer installation structure.

As shown in FIG. 2, in a computer installation structure, the monitor 1 is operated by receiving electric power from a power cable 11, and a signal outputted from the computer 14 through the cable 12 connecting the monitor 1 and the computer 14 is received by the monitor 1 for thereby displaying a certain image on the screen of the computer 14.

In addition, a power cable 13 is additionally used for driving the computer 14. Therefore, the installation space of various cables is complicated, and a large installation space is required.

Figure 3:
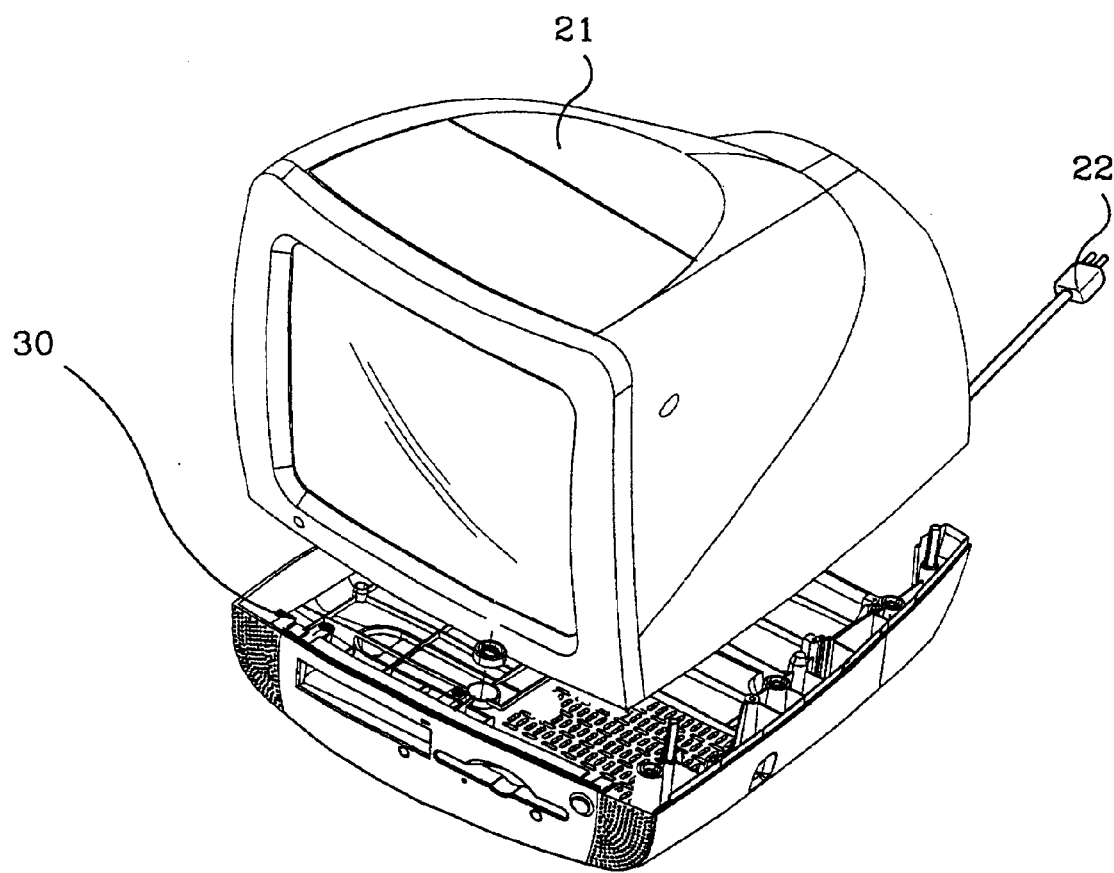
FIG. 3 is a perspective view illustrating an integration type personal computer according to the present invention.
Figure 4:
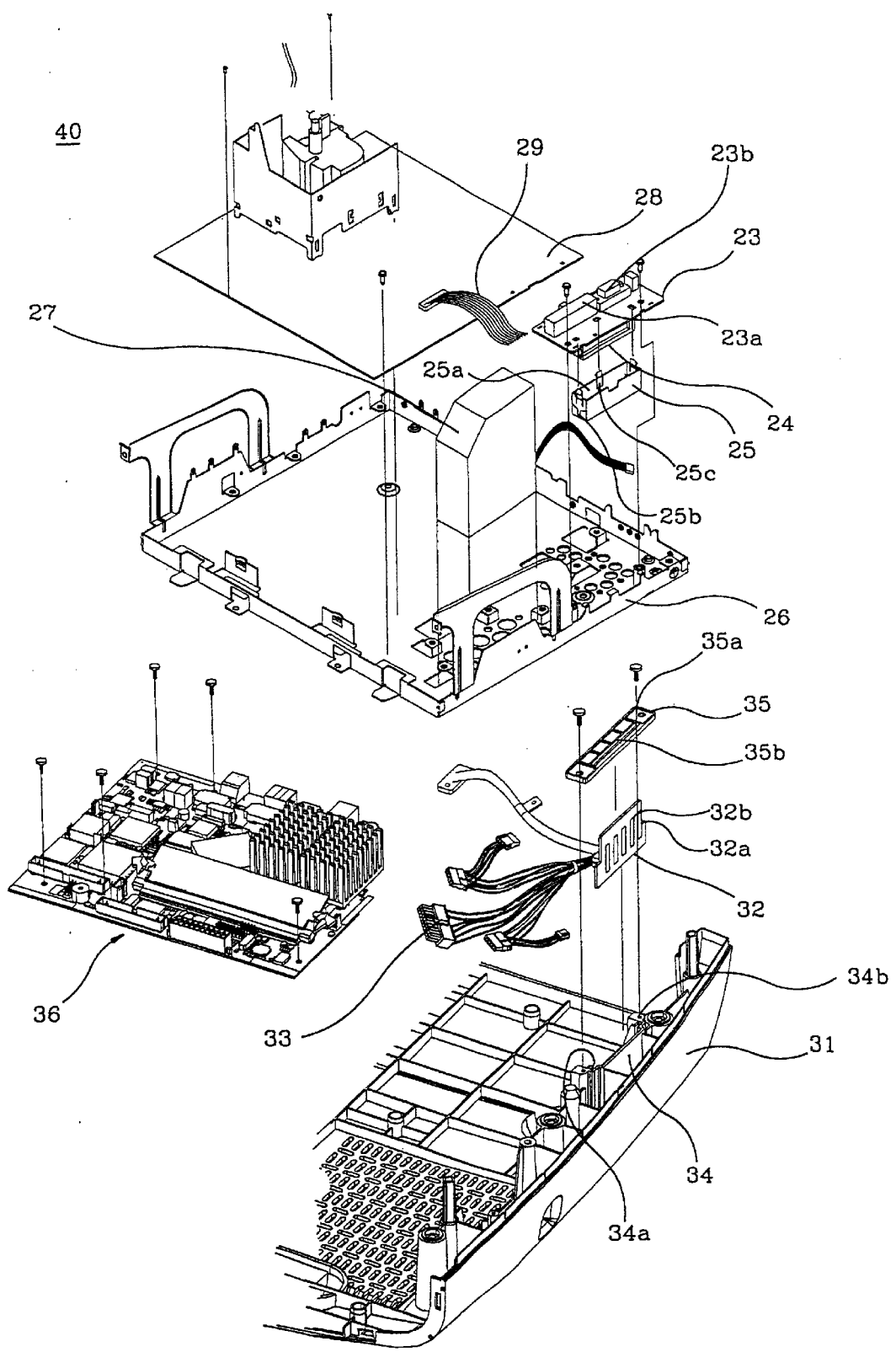
FIG. 4 is an exploded perspective view illustrating a power and signal supply apparatus according to the present invention.

The embodiments of the present invention will be explained with reference to the accompanying drawings. As shown in FIGS. 3 and 4, in an integration type computer according to the present invention, a body 30 of a computer is connected to a lower portion of a casing of a monitor 21, and the computer 30 and the monitor 21 are operated by an electric power supplied by a power and signal supply apparatus for thereby transferring a signal of the computer 30 to the monitor 21.

The power and signal supply apparatus 40 includes a docking PCB (printed circuit board) 23 and a docking connector 32. The docking PCB 23 is fixed on the right side of one surface of a bottom plate 26 disposed at a lower portion of the monitor 21. A switching mode power supply apparatus (SMPS) 27 is installed beside the docking PCB 23. In addition, a main PCB 28 of the monitor is installed at the left side of the bottom plate 26.

The docking PCB 23 includes a signal terminal 23a and a power terminal 23b and is connected with the main PCB 28 of the monitor 21 by a wire 29. In addition, the signals terminal 23a transmits a signal, and the power terminal 23b is connected with a switching mode power supply apparatus 27.

Figure 5:
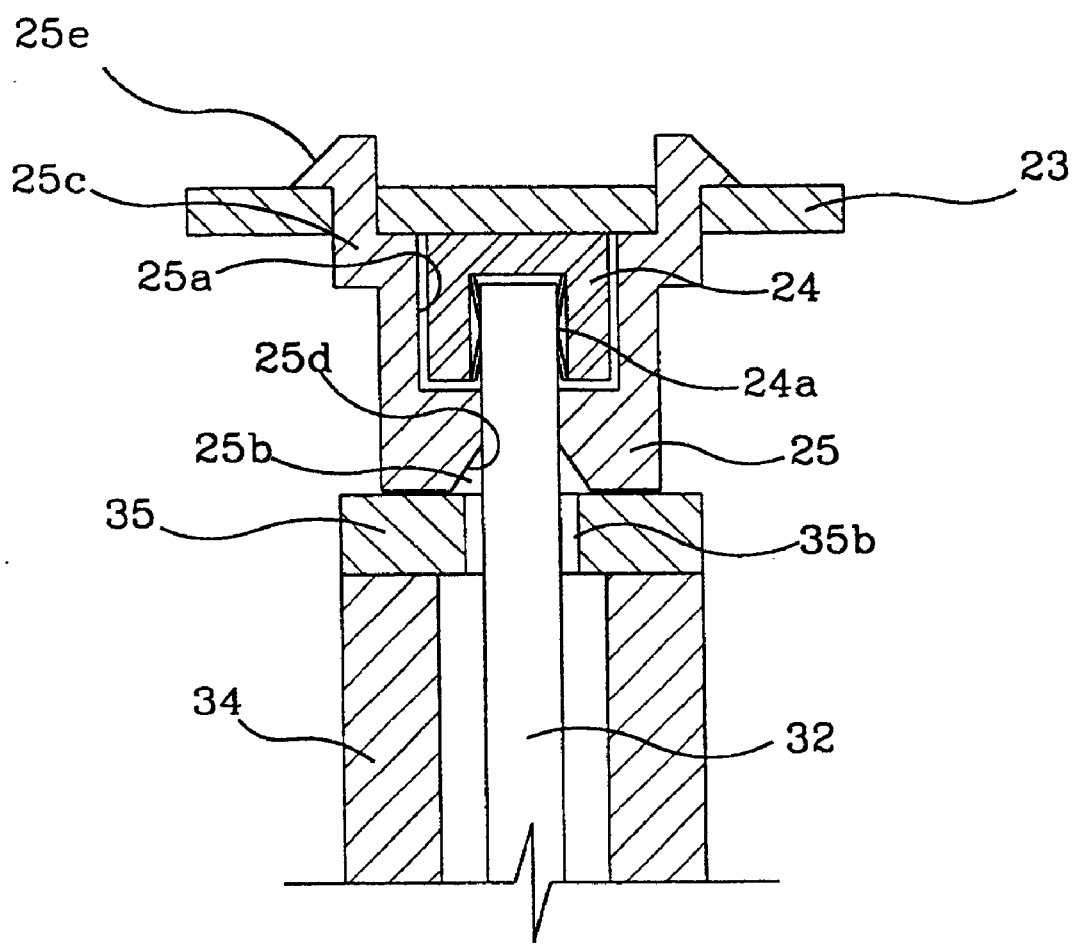
FIG. 5 is a cross-sectional view illustrating an engaging state of a power and signal supply apparatus according to the present invention.

In addition, an insertion jack 24 includes a power and signal elastic terminal 24a therein and is provided below the docking PCB 23. The insertion jack 24 is engaged with the docking connector 32. As shown in FIG. 5, the elastic terminal 24a of the insertion jack 24 is elastically installed. When the docking connector 32 is inserted, the elastic terminal 24a is moved backwards moved and closely contacts the docking connector by a recovering force of the same.

A docking guide 25 is formed at an outer portion of the insertion jack 25 for thereby implementing an easier insertion of the docking connector 32. The docking guide 25 includes an insertion portion 25a into which the insertion jack 24 is inserted and an insertion hole 25b having a taper 25d so that the upper portion of the docking connector 32 is easily inserted into the insertion hole. In addition, the docking guide 25 includes a plurality of protrusions 25c extending to the engaging portion 25e at an outer portion of docking guide 25 for thereby engaging the docking PCB 23.

The docking connector 32 of the power and signal supply apparatus 40 is formed in a square shape and includes an integrated power and signal terminal 32b and a terminal 32a and has a stepped shape formed at both sides thereof in such a manner that the upper portion is smaller than the lower portion. The lower portion of the docking connector 32 is connected with the wire 33 connected with each terminal 32b and the wire is connected with the main PCB 36 of the computer 30. The bottom cover 31 of the computer 30 includes a fixing portion 34 having a slotted shaped insertion portion 34a at both sides for thereby being fixed with the docking connector 32. The slot of insertion portion 34a has an allowance so that the lower portion of the docking connector 32 is inserted thereinto and is movable therein, and the insertion portion, or insertion terminal, 34a has an engaging hole 34b formed near each slot on both sides of fixing portion 34 for connecting to connector holder 35.

The connector holder 35 is formed in a rectangular shape and includes an insertion hole 35a at both ends of the same and a square insertion hole 35b larger than the width of the upper portion of the docking connector 32 and smaller than the lower portion of the same. Therefore, when the upper portion of the docking connector 32 is inserted into the square hole 35b of the connector holder 35, it is movable in front, rear, left and right directions. The lower portion does not pass through.

The lower portion of the docking connector 32 is movably inserted into the fixing portion 34 of the bottom cover 31 of the computer 30, and the connector holder 35 passes through the upper portion of the docking connector 32 on the upper surface of the fixing portion 34 for thereby implementing an engagement. The docking connector 32 is fixed by the fixing portion 34 and the connector holder 35 and is movable in all directions.

The assembling operation according to the present invention will be explained with reference to the accompanying drawings. As shown in FIGS. 4 and 5, the power and signal supply apparatus 40 is implemented based on an engaging structure method based on a docking type with respect to a power and signal connection between the computer 30 and the monitor 21.

Namely, the upper portion of the docking connector 32 having the terminal 32b is inserted into the insertion jack 24 of the docking PCB 23 having the elastic terminal 24a based on a docking type. The docking connector 32 is movable in all directions and is inserted into the insertion jack 24. The bottom surface of the docking guide 25 inserted into the insertion jack 24 has a certain taper 25d, so that the docking connector 32 is inserted along the taper 25d based on a sliding method.

Therefore, it is possible to prevent any damage such as a disconnection problem of the connector 32 which occurs when the docking connector 32 is not correctly inserted. In addition, The elastic terminal 24a of the interior of the insertion jack 24 of the docking PCB 23 into which the docking connector 32 is inserted pushes the terminal 32b of the docking connector for thereby enhancing a docking effect.

When the docking connector 32 is inserted into the docking PCB 23, the power and signal terminal 32b of the docking connector 32 closely contacts with the power terminal and the signal elastic terminal 24a of the docking PCB 23. Therefore, the power supplied from the switching mode power supply apparatus 27 of the monitor 21 through the power and signal supply apparatus 40 is supplied to the main PCB 36 of the computer 30 for thereby driving the computer 30. In addition, the signals of the main PCB 36 of the computer 30 are transferred to the main PCB 28 of the monitor 21 for thereby displaying a certain image on the screen of the monitor.

When disassembling the monitor 21 and the computer 30, the power and signal supply apparatus 40 is upwardly lifted in a state that the docking PCB 23 and the docking connector 32 are engaged. Therefore, the docking connector 32 is easily separated from the insertion jack 24 of the docking PCB 23 for thereby removing additional disassembling operation.

Therefore, the power and signal supply apparatus according to the present invention is implemented based on a docking method for thereby implementing an easier engaging and disassembling operation. In addition, it is possible to prevent any damage such as a disconnection problem by compensating a certain position deviation when engaging the system.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for supplying a power and signal for an integration type personal computer, comprising:
   a docking PCB (Printed Circuit Board) having a plurality of terminals connected with a main PCB and a switching mode power supply apparatus of, installed in a monitor and an insertion jack at a lower portion thereof; and
   a docking connector fixed at one side of a cover of a computer and having a plurality of terminals connected with the main PCB of the computer and having an upper portion inserted into an insertion jack of the docking PCB and connected with a plurality of terminals of the docking PCB,
   whereby electrical power for the switching mode power supply apparatus installed in the monitor is supplied to the computer, and a signal of the computer is supplied to the monitor.

2. The apparatus of claim 1, wherein said docking connector is movably fixed at one side of a cover of the computer and is inserted into the insertion jack based on a position correction when an insertion position in the insertion jack of the docking PCB is deviated.

3. An apparatus for supplying a power and signal for an integration type personal computer, comprising:
   a docking PCB (Printed Circuit Board) having a plurality of terminals connected with a main PCB and a switching mode power supply apparatus of a monitor and an insertion jack at a lower portion thereof;
   a docking connector fixed at one side of a cover of a computer and having a plurality of terminals connected with the main PCB of the computer and having an upper portion inserted into an insertion jack of the docking PCB and connected with a plurality of terminals of the docking PCB; and
   a docking guide inserted into an insertion jack of the docking PCB and having an insertion hole having a taper formed at a bottom surface, so that the docking guide is slidably inserted along a slanted surface of the taper,
   whereby electrical power for the switching mode power supply apparatus installed in the monitor is supplied to the computer, and a signal of the computer is supplied to the monitor.

4. A computer apparatus, comprising:
   a docking printed circuit board for connecting to a main printed circuit board of a monitor, said docking printed circuit board comprising:
      a signal terminal, for transmitting a signal;
      a power terminal; and
      an insertion jack on a lower portion of the docking printed circuit board;
   a switching mode power supply apparatus connected to said power terminal; and
   a docking connector for connection to a main printed circuit board of a computer and for engaging with said insertion jack, said docking connector comprising:
      an integrated power and signal terminal; and
      a wire connected at a lower portion of the docking connector and connected with the integrated power and signal terminal.

5. The computer apparatus of claim 4, said insertion jack further comprising:
   a docking guide formed at the outer portion of the insertion jack for facilitating the engaging of the docking connector; and
   an elastic terminal for engaging a terminal of the docking connector.

6. The computer apparatus of claim 4, further comprising:
   said docking connector being formed in a rectangular shape.

7. The computer apparatus of claim 5, said docking guide further comprising:
   an insertion portion for receiving the docking connector;
   said docking guide having an insertion hole having a taper for guiding the upper portion of the docking connector.

8. The computer apparatus of claim 7, said docking guide further comprising:
   a protrusion having an engaging portion for engaging the docking printed circuit board.

9. The computer apparatus of claim 6, further comprising:
   a connector holder for holding the upper portion of the docking connector, said connector holder being formed in a rectangular shape.

10. The computer apparatus of claim 6, further comprising:
    a bottom cover of the computer, comprising:

a fixing portion having a slotted insertion portion on each side of the fixing portion, for engaging the docking connector.

11. The computer apparatus of claim 9, said connector holder having first insertion holes formed in each end of the connector holder; and said connector holder also having a second rectangular insertion hole larger of width larger than the width of the upper portion of the docking connector and smaller than the lower portion of the docking connector, for receiving the upper portion of the docking connector.

12. The computer apparatus of claim 10, further comprising:

a connector holder for holding the upper portion of the docking connector, said connector holder being formed in a rectangular shape;

said connector holder having first insertion holes formed in each end of the connector holder;

said insertion portions each having an engaging hole for receiving a fastener for fixing the connector holder through the insertion holes of the connector holder.

13. The computer apparatus of claim 10, further comprising:

a main printed circuit board of the computer mounted above the bottom cover and connected to said docking connector.

14. The computer apparatus of claim 13, further comprising:

a bottom plate of a monitor of the computer, installed above the main printed circuit board of the computer and at a lower portion of the monitor of the computer;

said docking printed circuit board installed near one side of one surface of the bottom plate;

said switching mode power supply installed beside said docking printed circuit board; and the main printed circuit board of the monitor being mounted on another side on the one surface of the bottom plate.

15. The computer apparatus of claim 14, the computer apparatus being constructed as an integration-type computer apparatus with an integrated computer and monitor.

16. The computer apparatus of claim 15, said power and signal terminal of the docking connector contacting said power terminal and said signal terminal of the docking printed circuit board, for supplying power from the switching mode power supply apparatus to the main printed circuit board of the computer and transferring signals from the main printed circuit board of the computer to the main printed circuit board of the monitor.

* * * * *